(12) United States Patent
Quach et al.

(10) Patent No.: US 7,131,029 B2
(45) Date of Patent: Oct. 31, 2006

(54) METHOD FOR EFFICIENTLY IDENTIFYING ERRANT PROCESSES IN A COMPUTER SYSTEM BY THE OPERATING SYSTEM (OS) FOR ERROR CONTAINMENT AND ERROR RECOVERY

(75) Inventors: Nhon T. Quach, Santa Clara, CA (US); Amy L. O'Donnell, Chandler, AZ (US); Asit K. Mallick, Santa Clara, CA (US); Koichi Yamada, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 400 days.

(21) Appl. No.: 10/801,153

(22) Filed: Mar. 16, 2004

(65) Prior Publication Data

US 2004/0221189 A1 Nov. 4, 2004

Related U.S. Application Data

(63) Continuation of application No. 09/732,306, filed on Dec. 8, 2000, now Pat. No. 6,745,346.

(51) Int. Cl.
G06F 11/00 (2006.01)
G06F 12/00 (2006.01)

(52) U.S. Cl. .................. 714/15; 714/20; 714/34; 712/244; 711/203

(58) Field of Classification Search .................. 714/15, 714/20, 34, 49; 711/205, 207
See application file for complete search history.

(56) References Cited

U.S. PATENT DOCUMENTS 4,538,265 A 8/1985 Day et al. ...................... 714/17
5,790,804 A 8/1998 Osborne ...................... 709/245
6,247,118 B1 6/2001 Zumkehr et al. ............ 712/228
6,598,179 B1 * 7/2003 Chirashnya et al. .......... 714/37
6,745,346 B1 * 6/2004 Quach et al. .................. 714/42
7,020,738 B1 * 3/2006 Neiger et al. ................... 711/6
2002/0129272 A1 * 9/2002 Terrell et al. ................ 713/201

* cited by examiner

Primary Examiner—Robert Beausoliel
Assistant Examiner—Christopher S. McCarthy
(74) Attorney, Agent, or Firm—Kenyon & Kenyon LLP (57) ABSTRACT

The present invention relates to a method and system for efficiently identifying errant processes in a computer system using an operating system (OS) error recovery method that identifies if the error caused by the errant process can be recovered and, if so, can recover from the error. The method and system of the present invention operates after standard Error Correcting Code (ECC) and parity check bit methods and systems are unsuccessful in recovering from the error. In accordance with an embodiment of the present invention, the method and system includes detecting an error during instruction execution, storing a physical address of an errant process that caused the error, and storing an execution instruction pointer (IP) in a processor including at least one critical memory structure to detect an error and a processor error processing logic hardware coupled to the at least one critical memory structure. The processor error processing logic hardware to store a physical address of an errant process that caused the error, store an execution instruction pointer (IP) in an interruption instruction pointer (IIP), determine a first virtual address from an operating system mapping table, determine a second virtual address from a translation look-aside buffer, and identify the errant process, if the physical address and the second virtual address match the physical address and the first virtual address.

29 Claims, 5 Drawing Sheets

METHOD FOR EFFICIENTLY IDENTIFYING ERRANT PROCESSES IN A COMPUTER SYSTEM BY THE OPERATING SYSTEM (OS) FOR ERROR CONTAINMENT AND ERROR RECOVERY

CROSS REFERENCE TO RELATED APPLICATIONS

This application is a continuation of application Ser. No. 09/732,306 filed Dec. 8, 2000, now U.S. Pat. No. 6,745,346, which is incorporated herein in its entirety by reference thereto.

FIELD OF THE INVENTION

The present invention relates to highly reliable processor implementations and architectures, and in particular, to processor implementations and architectures that rely on an operating system (OS) for error recovery.

BACKGROUND

All semiconductor integrated circuits, including microprocessors, are subject to soft errors, which are caused by alpha particle bombardment and gamma ray radiation. If left undetected, these soft errors can cause data corruption, leading to undefined behaviors in computer systems. To combat problems caused by these soft errors, many microprocessors today use parity or Error Correcting Code (ECC) check bits to protect the critical memory structures inside the chips. While parity protection allows soft errors to be detected only, ECC can both detect and correct the errors, however, the correction hardware is often expensive in terms of the silicon area that it consumes and the timing impact that it has on the final operation frequency of the processor. For this reason, this extra correction hardware is often not implemented. Alternatively, many hardware implementations have used a hybrid scheme in which more performance sensitive errors have been corrected fully in the hardware while less performance sensitive ones have been handled in software. So, with both parity and ECC protection schemes, there is a desire to implement an efficient software error correction scheme.

In a typical software error correction scheme, whenever a soft error is detected by the hardware, execution control is transferred to an error handler. The error handler can then terminate the offending process (or processes) to contain the error and minimize its impact. After the error is handled by the error handler, the terminated process (or processes) can be restarted. In this way, since only the offending process (or processes) is (are) affected, the system remains intact.

DETAILED DESCRIPTION

In accordance with embodiments of the present invention, a method for efficiently identifying errant processes in a computer system by an operating system (OS) for error recovery, is described herein. As a way of illustration only, in accordance with an embodiment of the present invention, a method for efficiently identifying errant processes in an Intel® Architecture 64-bit (IA-64) processor is described, however, this embodiment should not be taken to limit any alternative embodiments, which fall within the spirit and scope of the appended claims. IA-64 processors are manufactured by Intel Corporation of Santa Clara, Calif.

Figure 1:
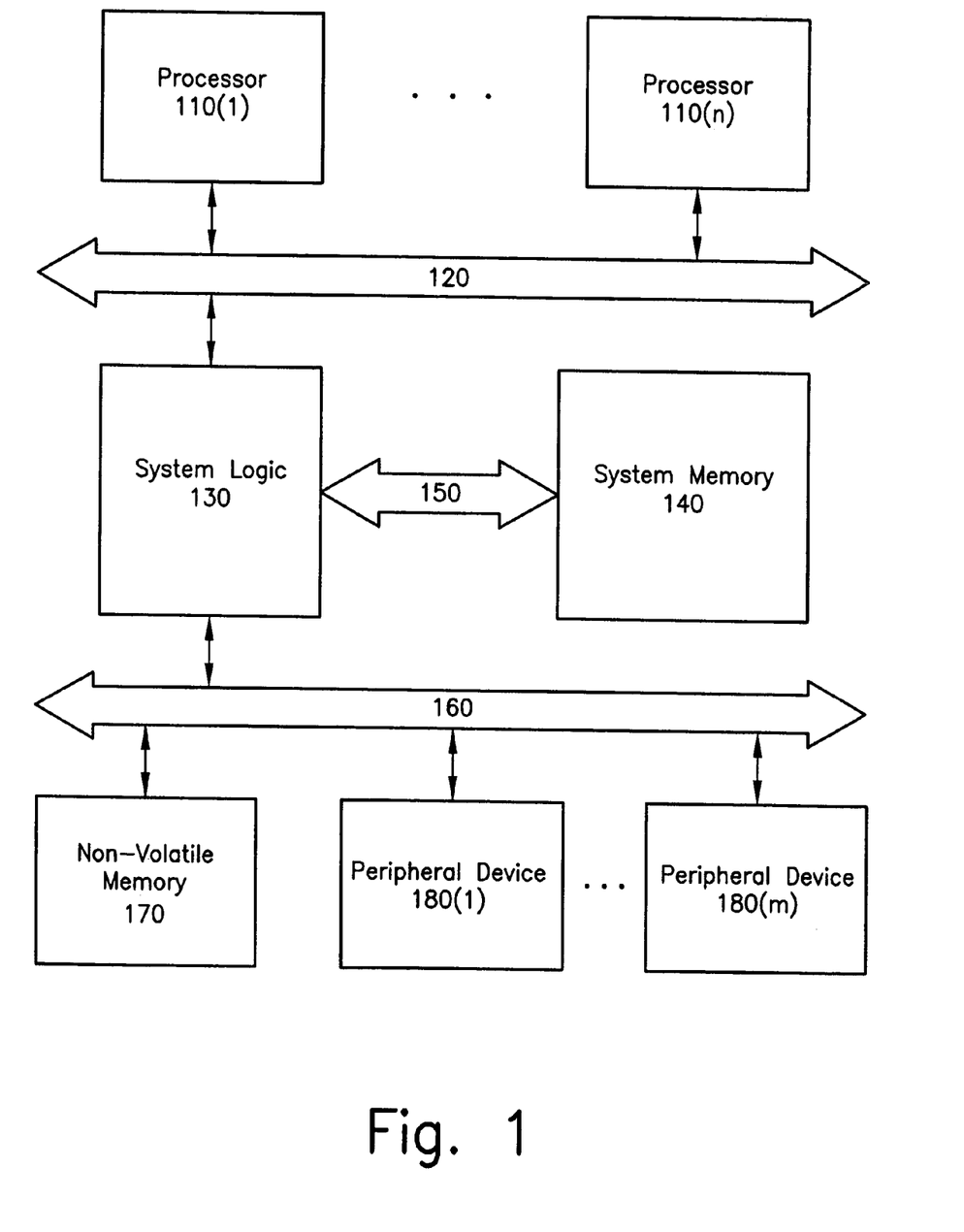
FIG. 1 is a block diagram of a computer system in which an operating system (OS) error containment and recovery method and system can be implemented, in accordance with an embodiment of the present invention.

FIG. 1 is a block diagram of a computer system 100 that is suitable for implementing the present invention. In FIG. 1, the computer system 100 can include one or more processors 110(l)–110(n) coupled to a processor bus 120, which can be coupled to a system logic 130. Each of the one or more processors 110(l)–110(n) are N-bit processors and can include one or more N-bit registers (not shown). The system logic 130 can be coupled to a system memory 140 through bus 150 and can be coupled to a non-volatile memory 170 and one or more peripheral devices 180(l)–180(m) through a peripheral bus 160. The peripheral bus 160 can be represented by, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(l)–180(m) can include, for example, a keyboard; a mouse or other pointing devices; mass storage devices such as hard disk drives, compact disc (CD) drives, optical disks, and digital video disc (DVD) drives; displays and the like.

In an embodiment of the present invention, the processors 110(l)–110(n) may be 64-bit processors.

Figure 2:
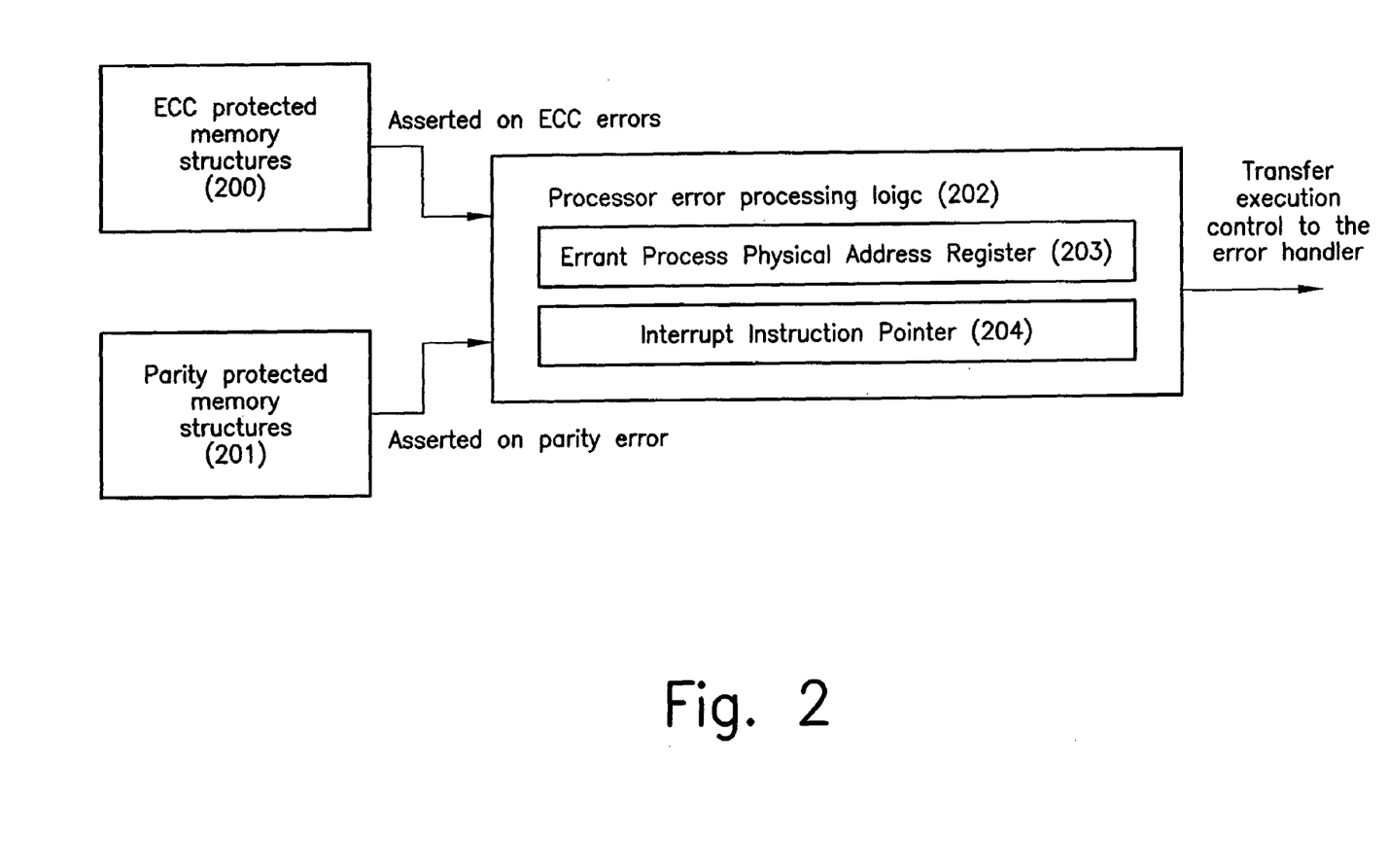
FIG. 2 is a functional block diagram of a hardware block configuration, in accordance with an embodiment of the present invention.

FIG. 2 is a functional block diagram of a hardware block configuration, in accordance with an embodiment of the present invention. In FIG. 2, all critical memory structures 200 and 201 on a processor are either protected by parity or ECC. On detecting an error, these structures will assert the error signals to the processor error processing logic 202. The processor error processing hardware will save the following information:

The physical address (PA) of an offending operation (that is, the operation that caused the error) in an errant process physical address register 203

The instruction pointer at the time the error is detected in an interruption instruction pointer (IIP) register 204.

The processing logic 202 then transfers execution control of the processor to the error handler.

Since the current IA-64 processor architecture already logs the IIP as part of handling interrupts and machine check, the only additional information that is needed is a physical address (PA) of the offending instruction. Fortunately, the PA is readily available in all memory transactions, so being able to log the PA can be accomplished by storing the PA of the errant instruction in the errant process PA register 203 or other storage resource that can be dedicated to store the PA. In an embodiment of the present invention, the errant process PA register 203 can be updated with the PA of the offending instruction when an error is detected.

As used herein, the terms "offending process" and "errant process" may be used interchangeably. Likewise, the term "process" includes a program being run on one or more processors of a computer, for example, having its instructions executed by one or more processors of the computer, or a thread of a program being run on the computer.

Similarly, in accordance with an embodiment of the present invention, the OS, generally:

a. Keeps a mapping table (or an equivalent data structure such as a buffer and a cache array) for maintaining a mapping between all of the virtual addresses (VAs) and the PAs so that each VA will be mapped to a PA. The OS updates the mapping table every time the OS requires a new page, for example, when the OS handles a page fault.

b. Determines, using the IIP, whether the affected process is in a critical section of the code.

The mapping table can also store information on whether the page containing the errant process is global, shared or private. A "global" page is shared by all processes. A "shared" page is shared by a group of all of the processes, where the size of the group is less than all of the processes. A "private" page is owned by a single process. Table 1 summarizes how the OS can identify the errant process, in accordance with an embodiment of the present invention.

it is executed, it is possible that the errant process and the affected process may be different.

In accordance with an embodiment of the present invention, the mapping table is kept up-to-date by the OS every time the OS re-maps a page. This re-mapping can present a problem in a multi-processor system, since it is possible for a kernel process running on one processor handling a page fault to re-map a page and to change the mapping table while another process running on another processor is handling an error and examining the mapping table. In accordance with an embodiment of the present invention, the above problem is avoided by validating the mapping contained in the mapping table against that contained in the instruction or data translation look-aside buffer (TLB) in the processor. A "TLB" is a hardware table maintained in the processor that matches virtual addresses to physical addresses translations. A translation entry is only considered valid if it can be found in both the mapping table that the OS keeps as well as in the TLB inside the processor. This technique works because before an entry can be changed in the mapping table, the relevant entry must be removed from the processor TLBs. A "translation" or an "address translation" provides a translation from one address location to another address, for example, a virtual address into a physical address. The process of translating virtual addresses into physical addresses is called mapping.

If, on the other hand, a translation can be found only in the OS mapping table, and not in the processor TLB, the translation is considered invalid and the errant process (or

TABLE 1

| Case | Errant PA | IIP | OS Recovery Action |
|---|---|---|---|
| 1 | 0 | X | No recovery is possible because errant PA is not known |
| 2 | X | Critical | No recovery is possible because IIP indicates that the affected process is in a critical region. |
| 3 | Global | Non-critical | If the IIP is precise, then the OS may terminate the errant process only. If the IIP is imprecise, then no recovery is possible because the Errant PA indicates that the memory region is global. |
| 4 | Shared | Non-critical | If the IIP is precise, then the OS may terminate the errant process only. If the IIP is imprecise, then the OS needs to terminate all shared processes. Otherwise, no recovery is possible. |
| 5 | Private | Non-critical | If the IIP is precise, then the OS may terminate the errant process using the precise IIP. If the IIP is imprecise, then the OS needs to terminate the errant process using the errant PA. Otherwise, no recovery is possible. |

In the table, The errant PA is the PA of the instruction or data memory location to which a memory access is made and in which the error is detected. The IIP indicates the instruction pointer of the affected process. The IIP is considered precise if it points to the instruction that causes the error to be detected; otherwise, it is considered imprecise. A process is considered to be in a critical section of the code if the process cannot be interrupted. Only kernel code can enter a critical section. In general, the "kernel code" is the code module responsible for managing system side resources such as physical memory, processes, disks, etc. The affected process is the executing process in which the error is detected and the errant process is the process that issues the instruction whose execution causes the error to be detected. In general, the errant process and the affected process are the same. However, since there is a delay between the time a memory operation is issued and the time processes) cannot be identified. In this case, no process termination is possible and the system must be reset.

In accordance with an embodiment of the present invention, the method and system described above can also provide additional information, such as an instruction set of the errant instruction using a processor status register instruction set (PSR.is) value to further enhance the ability of the OS to identify the errant process(es).

Figure 3:
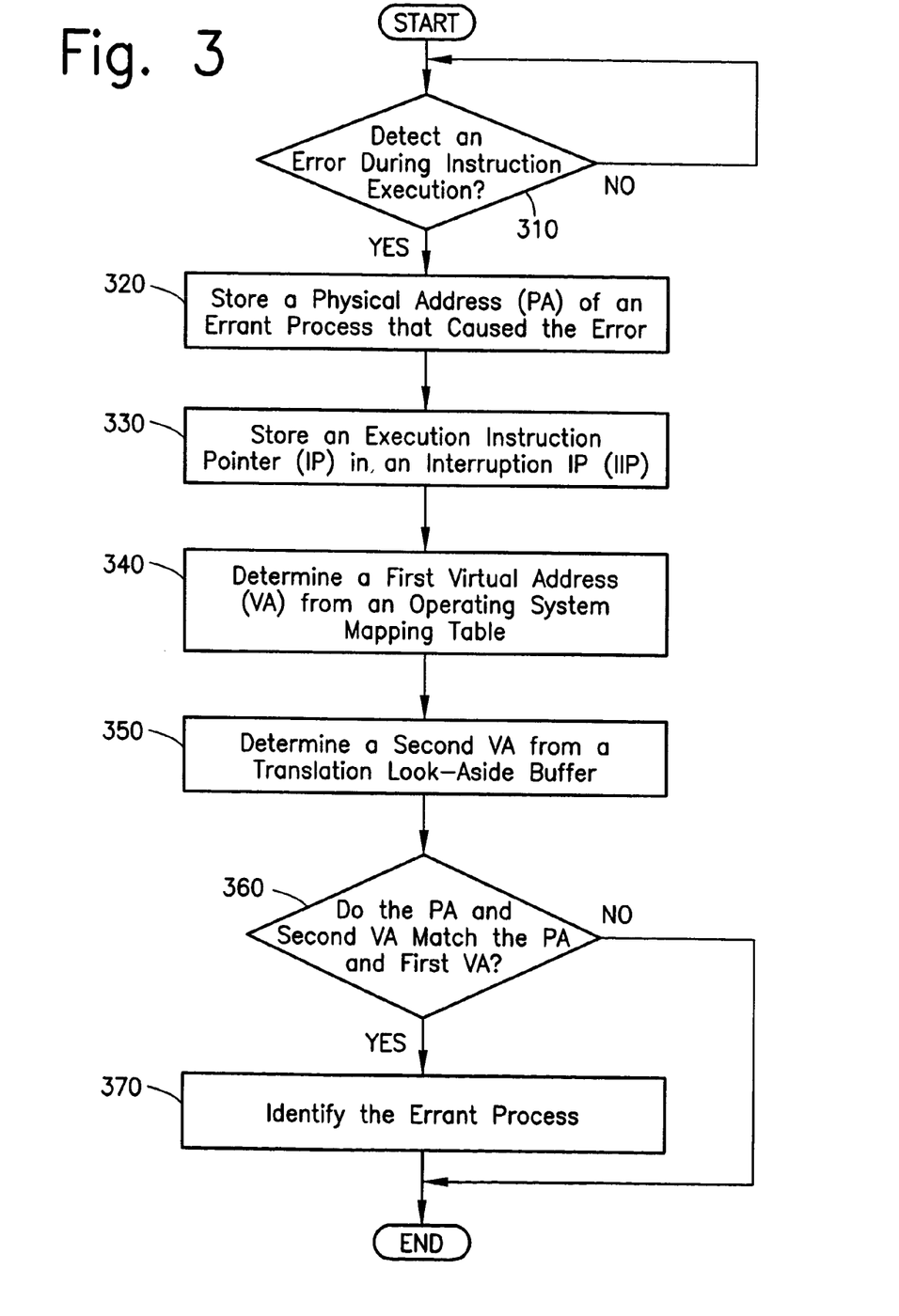
FIG. 3 is a flow diagram of a method for identifying errant processes in a computer system using operating system (OS) error containment and recovery, in accordance with an embodiment of the present invention.
Figure 4A:
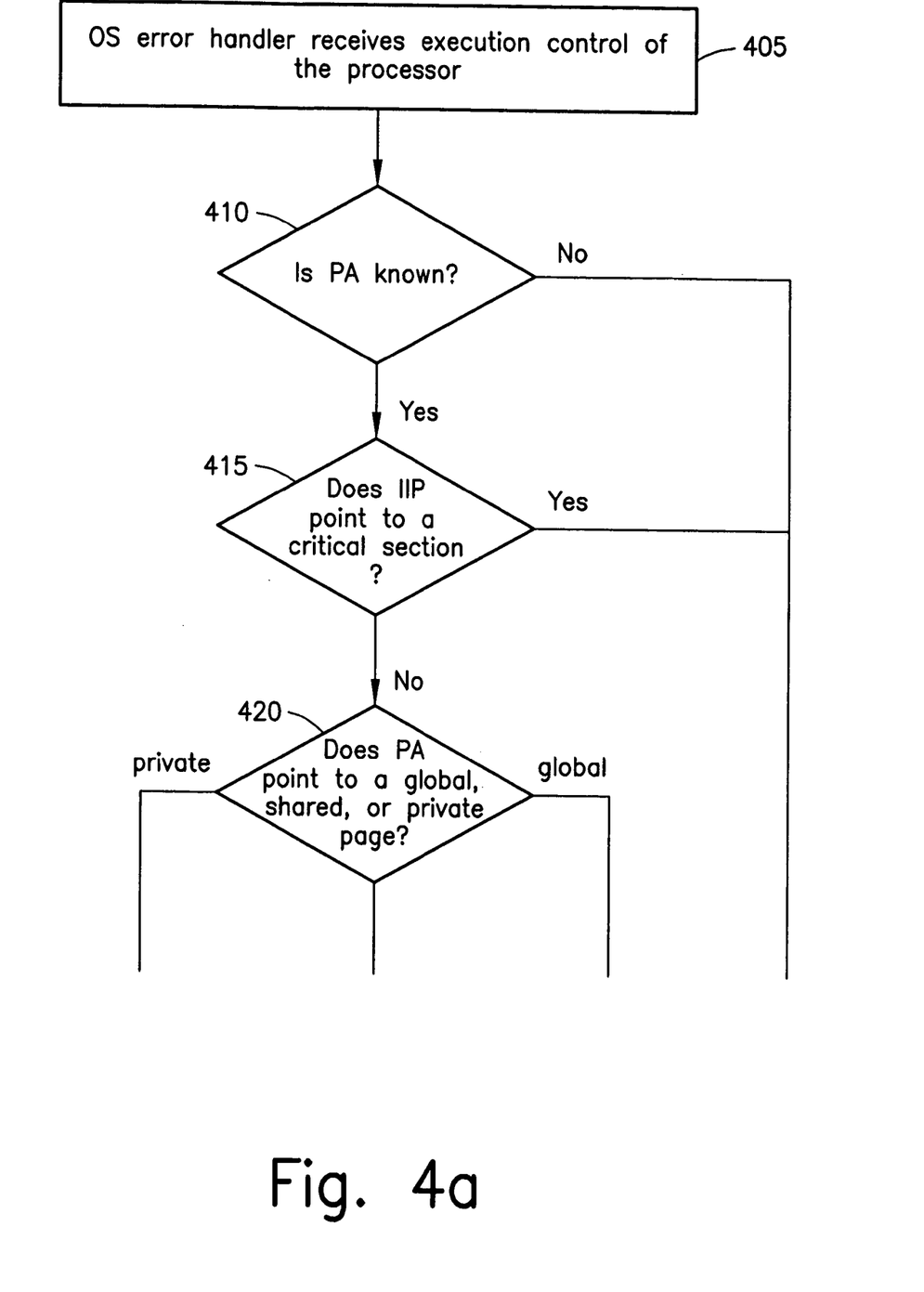
FIG. 4 is a flow diagram of a method for recovering from the errant process, in accordance with an embodiment of the present invention.
Figure 4B:
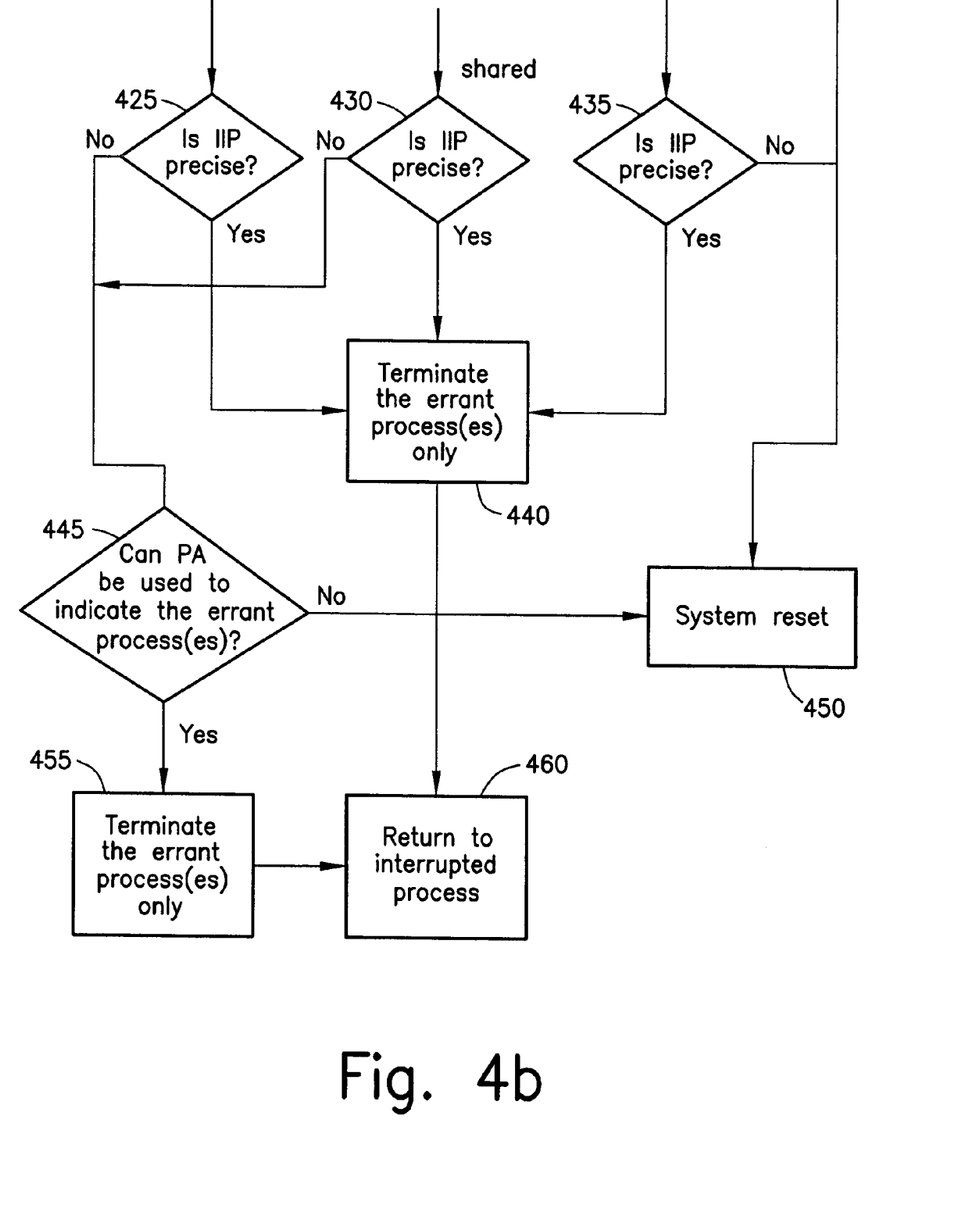

FIG. 3 is a flow diagram of a method for identifying errant processes in a computer system using OS error containment and recovery, in accordance with an embodiment of the present invention. In FIG. 3, a check is continually performed until the occurrence of an error is detected 310 during instruction execution. If an error is detected, the PA of the errant process that caused the error can be stored 320 in the errant process PA register 203. After the PA of the errant process is stored 320, the execution instruction pointer (IP) can be stored 330, generally, in an IIP. The method can then use 340 the PA to lookup, in an OS mapping table, a virtual address (VA) for the errant process. In accordance with an embodiment of the present invention, the OS mapping table can be maintained in a table or similar data structure and the OS mapping table is, generally, updated every time the OS handles a page fault. Unfortunately, as described above, updating the OS mapping table every time the OS handles a page fault can cause problems in a multi-processor system. In a multi-processor system, for example, it is possible for a kernel process running on one processor to be handling a page fault to re-map a page and to change the mapping table while another process running on another processor is handling an error and examining the mapping table. Therefore, to overcome this problem, the method can use 350 the PA to look up, in a processor TLB, a second VA, and, then, can compare 360 the PA and second VA with the PA and the VA from the mapping table. If the two pairs do not match, then the method can not recover from the errant process and the instruction execution is complete. However, if the two pairs do match, then the method can identify 370 the errant process. FIG. 4, in accordance with an embodiment of the present invention, provides a flow diagram of a process that can be used to recover from the errant process. In accordance with an embodiment of the present invention, the errant process is not recoverable if the location of the errant process is unknown or the errant process is occurring in a critical section of the processor code, for example, in the kernel. If the errant process is known and not in the critical section, then the errant process is considered to be non-critical and can possibly be recovered.

FIG. 4 is a flow diagram of a method for recovering from the errant process, in accordance with an embodiment of the present invention. In FIG. 4, after an error has been detected an OS error handler can receive 405 execution control of the processor to try to recover from the error. The OS can then determine 410 if the PA is known and, if it is not known the system be reset 450. If the PA is known, then, the OS can determine 415 if the IIP points to a critical section. If the PA does point to a critical section, then, the system can be reset 450. However, if the PA does not point to a critical section, then, a check can be performed to determine 420 whether the page pointed to by the PA is a global, shared or private page. If the page pointed to the PA is global, the IIP of the errant process can be checked 420 to determine if the IIP is precise. If the IIP is not precise, then the method can not recover the errant process and the system can be reset 450. However, if the IIP is precise, then the method can terminate 440 the errant process(es) only and, then, return 460 to the interrupted process. If the page pointed to by the PA is shared, the IIP of the errant process can be checked 430 to determine if the IIP is precise. If the IIP is not precise, then the PA can be checked 445 to determine if it can be used to indicate the errant process(es). If the PA can be used, then, the method can terminate 455 the errant process(es) only, and, then, return 460 to the interrupted process. However, if the IIP is precise, the method can terminate 440 the errant process only, and, then, return 460 to the interrupted process. If the page pointed to by the PA is private, the IIP of the errant process can be checked 425 to determine if the IIP is precise. If the IIP is not precise, then the PA can be checked 445 to determine if it can be used to indicate the errant process(es). If the PA can be used, then, the method can terminate 455 the errant process(es), and, then, return 460 to the interrupted process. However, if the IIP is precise, the method can terminate 440 the errant process and, then, return 460 to the interrupted process.

In accordance with an embodiment of the present invention, a method includes detecting an error during instruction execution, storing a physical address of an errant process that caused the error, and storing an execution instruction pointer (IP) in an interruption instruction pointer (IIP). The method further includes determining a first virtual address from an operating system mapping table, determining a second virtual address from a translation look-aside buffer, and identifying the errant process, if the physical address and the second virtual address match the physical address and the first virtual address.

In accordance with an embodiment of the present invention, a machine-readable medium having stored thereon a plurality of executable instructions, the plurality of instructions including instructions to: detect an error, store a physical address of an errant process that caused the error, and store an execution instruction pointer (IP) in an interruption instruction pointer (IIP). The instructions further include instructions to: determine a first virtual address from an operating system mapping table, determine a second virtual address from a translation look-aside buffer, and identify the errant process, if the physical address and the second virtual address match the physical address and the first virtual address.

In accordance with an embodiment of the present invention, a computer system includes a processor, a system memory coupled to the processor and a machine-readable medium having stored thereon a plurality of executable instructions, the plurality of instructions including instructions to: detect an error, store a physical address of an errant process that caused the error, and store an execution instruction pointer (IP) in an interruption instruction pointer (IIP). The instructions further include instructions to: determine a first virtual address from an operating system mapping table, determine a second virtual address from a translation look-aside buffer, and identify the errant process, if the physical address and the second virtual address match the physical address and the first virtual address.

In an embodiment of the computer system, the machine-readable medium includes a non-volatile memory.

It should, of course, be understood that while the present invention has been described mainly in terms of 64-bit microprocessor-based and 64-bit multi-processor-based personal computer systems, those skilled in the art will recognize that the principles of the invention, as discussed herein, may be used advantageously with alternative embodiments involving other integrated processor chips and computer systems. Accordingly, all such implementations which fall within the spirit and scope of the appended claims will be embraced by the principles of the present invention.

What is claimed is:

1. A processor comprising: at least one critical memory structure to detect an error; and a processor error processing logic hardware coupled to the at least one critical memory structure, the processor error processing logic hardware to store a physical address of an errant process that caused the error, store an execution instruction pointer (IP) in an interruption instruction pointer (IIP), determine a first virtual address from an operating system mapping table, determine a second virtual address from a translation look-aside buffer, and identify the errant process, if the physical address and the second virtual address match the physical address and the first virtual address.

2. The processor of claim 1 wherein the processor error processing logic hardware is further to:
   determine whether the physical address of the physical memory location is known;

determine in which code section the errant process is located, if the physical memory location is known;

reset the processor, if the physical memory location is in one of a critical section and an unknown section of the code; and terminate the errant process based on a level of sharing of the physical memory location and whether the IIP associated with the errant process is precise, if the physical memory location is in a non-critical section of the code.

3. The processor of claim 1 wherein the processor error processing logic hardware is to store the physical address of the errant process that caused the error in a memory register.

4. The processor of claim 1 wherein the processor error processing logic hardware to determine the first virtual address from the operating system mapping table comprises:

the processor error processing logic hardware to find a physical address entry in the operating system mapping table that matches the physical address, and to read the first virtual address from the matching physical address entry, if the matching physical address entry is found.

5. The processor of claim 1 wherein the processor error processing logic hardware to determine the second virtual address from the translation look-aside buffer comprises:

the processor error processing logic hardware to find a physical address entry in the translation look-aside buffer that matches the physical address, and to read the second virtual address from the matching physical address entry, if the matching physical address entry is found.

6. The processor of claim 1 wherein said execution instruction pointer comprises:

an instruction pointer that existed at the time the error is detected.

7. The processor of claim 1 wherein the processor error processing logic hardware comprises:

a register to store the physical address of the errant process.

8. The processor of claim 1 wherein the processor error processing logic hardware comprises:

an interruption instruction pointer register to store the execution instruction.

9. The processor of claim 1 wherein said at least one critical memory structure comprises at least one of:

an error correcting code protected memory structure; and a parity protected memory structure.

10. The processor of claim 9 wherein said error correcting code protected memory structure to assert an error signal, if said error correcting code protected memory structure detects an error.

11. The processor of claim 9 wherein said error correcting code protected memory structure to assert the error signal to the processor error processing logic hardware.

12. The processor of claim 9 wherein said parity protected memory structure to assert an error signal, if said parity protected memory structure detects an error.

13. The processor of claim 12 wherein said parity protected memory structure to assert the error signal to the processor error processing logic hardware.

14. A computer system, comprising:

a system memory; and a processor coupled to the system memory, the processor comprising:

at least one critical memory structure to detect an error; and a processor error processing logic hardware coupled to the at least one critical memory structure, the processor error processing logic hardware to store a physical address of an errant process that caused the error, store an execution instruction pointer (IP) in an interruption instruction pointer (IIP), determine a first virtual address from an operating system mapping table, determine a second virtual address from a translation look-aside buffer, and identify the errant process, if the physical address and the second virtual address match the physical address and the first virtual address.

15. The computer system of claim 14 wherein said processor error processing logic hardware comprises:

an errant process physical address register to store the physical address of the errant process that caused the error.

16. The computer system of claim 14 wherein said processor error processing logic hardware comprises:

an IIP register to store the execution IP.

17. The computer system of claim 14 further comprising:

a mapping table to maintain a mapping between all virtual addresses and all physical addresses in the computer system so that each virtual address is mapped to one physical address.

18. The computer system of claim 17, wherein the mapping table is implemented as:

a buffer.

19. The computer system of claim 17, wherein the mapping table is implemented as:

a cache array.

20. A computer system, comprising:

a system memory; and a plurality of processors coupled to the system memory, each of the plurality of processors comprising:

at least one critical memory structure to detect an error; and a processor error processing logic hardware coupled to the at least one critical memory structure, the processor error processing logic hardware to detect an error, store a physical address of an errant process that caused the error, store an execution instruction pointer (IP) in an interruption instruction pointer (IIP), determine a first virtual address from an operating system mapping table, determine a second virtual address from a translation look-aside buffer and identify the errant process, if the physical address and the second virtual address match the physical address and the first virtual address.

21. The computer system of claim 20 wherein said memory register comprises:

an errant process physical address to receive and store the physical address of the errant process that caused the error.

22. The computer system of claim 20 further comprising:

a mapping table to maintain a mapping between all virtual addresses and all physical addresses in the computer system so that each virtual address is mapped to one physical address.

23. The computer system of claim 22 wherein the mapping table is implemented as:

a buffer.

24. The computer system of claim 22 wherein the mapping table is implemented as:

a cache array.

25. The computer system of claim 22 wherein each of the plurality of processors further comprises:
   a translation look-aside buffer (TLB) to store physical addresses.

26. The computer system of claim 25 wherein the TLB is further to store second virtual addresses associated with the physical addresses.

27. The computer system of claim 25 further comprising:
   a firmware component to provide the physical addresses stored in the TLB.

28. The computer system of claim 27 wherein said firmware component further to provide the second virtual addresses stored in the TLB.

29. The computer system of claim 20 wherein said at least one critical memory structure comprises at least one of:
   an error correcting code protected memory structure; and
   a parity protected memory structure.

* * * * *